(12) United States Patent
Rivassou

(10) Patent No.: US 6,187,454 B1
(45) Date of Patent: Feb. 13, 2001

(54) METHOD OF COATING A METAL PART THAT IS TO BE SOLDERED, A COATING USED FOR THIS PURPOSE, AND A PART COATED IN THIS WAY

(75) Inventor: Yves Rivassou, St Etienne de Crossey (FR)

(73) Assignee: Radiall, Rosny-Sous-Bois (FR)

( * ) Notice: Under 35 U.S.C. 154(b), the term of this patent shall be extended for 0 days.

(21) Appl. No.: 09/116,712

(22) Filed: Jul. 16, 1998

(30) Foreign Application Priority Data

Jul. 25, 1997 (FR) .................................................. 97 09402

(51) Int. Cl.⁷ ....................................................... B32B 15/01
(52) U.S. Cl. .......................... 428/670; 428/670; 428/671; 428/672; 428/674; 428/429; 439/886; 439/887; 205/170; 205/176

(58) Field of Search ..................................... 428/671, 672, 428/674, 429, 670; 439/886, 887; 205/170, 176

(56) References Cited

U.S. PATENT DOCUMENTS

| 4,034,149 | 7/1977 | Zaleckas . |
| 5,180,482 | * 1/1993 | Abys et al. ........................... 205/224 |

* cited by examiner

Primary Examiner—Archene Turner
Assistant Examiner—Lymarie Miranda
(74) Attorney, Agent, or Firm—Schweitzer Cornman Gross & Bondell LLP

(57) ABSTRACT

A method of coating a metal part that is to be soldered, in particular a part of an electrical connector for high frequency signals, in which method a layer of white bronze is applied to said part. The layer of white bronze is initially covered in a fine layer of palladium, and then in a fine layer of gold.

6 Claims, No Drawings

METHOD OF COATING A METAL PART THAT IS TO BE SOLDERED, A COATING USED FOR THIS PURPOSE, AND A PART COATED IN THIS WAY

The present invention relates to a method of coating a metal part that is to be soldered, to a coating used for this purpose, and to a metal part coated in this way.

BACKGROUND OF THE INVENTION

It has been known for a long time to galvanize metals in order to protect them against corrosion.

This applies in particular to electrically conductive parts that have for a long time been covered in a fine layer of nickel.

Since nickel is a magnetic material, it is unsuitable for coating parts of electrical connectors, particularly those that are to convey high frequency signals.

Nickel has therefore been replaced by bronze, preferably white bronze of silvery appearance that is close to that of nickel, which material has sufficient electrical conductivity for the intended purpose, and has hardness that also protects coated parts effectively against the friction to which they can be subjected.

The drawback of untreated white bronze is its poor suitability for soldering.

To overcome that difficulty, it has been the practice to use activated soldering fluxes, thereby making it possible to solder appropriately, but requiring cleaning operations based on chlorofluorocarbons (CFCs).

Since the use of such substances has now been banned, solder joints on metal parts coated in white bronze are of poorer quality than before, and that can give rise to problems of reliability with connectors.

OBJECT AND SUMMARY OF THE INVENTION

The present invention seeks to solve this problem by providing a novel method of coating a metal part without degrading its suitability for soldering.

The present invention provides a method of coating a metal part that is to be soldered, in particular an electrical component, in which a layer of white bronze is applied to said part, wherein the layer of white bronze is covered firstly in a fine layer of palladium and then in a fine layer of gold.

In the invention, the term "fine layer" is used to mean a layer of thickness that lies preferably in the range 0.1 $\mu$m to 0.2 $\mu$m; the layer of gold can even be as fine as 0.05 $\mu$m.

The method of the invention thus provides metal parts suitable for soldering without subsequent CFC treatment, which parts are protected against corrosion, have sufficient surface hardness to withstand possible friction, are sufficiently conductive via their surfaces, and are non-magnetic.

In addition, these parts are durably protected in the sense that the coating they have degrades very slowly or not at all over time.

The invention also provides an anti-corrosion coating that is hard, non-toxic, non-magnetic, and solderable for metal parts, in particular electrical components, wherein the coating is constituted by:

a layer of white bronze;

covered in a fine layer of palladium; and covered in a fine layer of gold.

The term "non-toxic" is used to mean that the coating does not contain any metal that is known to be dangerous and that implementing the method is not harmful to the environment.

Because the coating is easily soldered, coated parts can be flow soldered with high efficiency and high reliability.

The invention also provides a metal part, in particular an electrical component, coated in the above-described coating.

The component is preferably a part of an electrical connector, in particular a high frequency electrical connector.

MORE DETAILED DESCRIPTION

To give a better understanding of the method of the invention, there follows a description of an implementation given by way of non-limiting example.

A body of a high frequency coaxial connector provided with studs for mechanical fixing and electrical connection to a printed circuit card is made of brass.

It is initially degreased and cleaned to remove any dirt from its surface.

A very fine layer of copper (known as a "flash" layer) is deposited over its entire surface to a thickness of 0.5 $\mu$m in order to improve adherence to the part and hide the other components of the brass alloy behind the layer of copper.

Thereafter the part is dipped in a tank containing white bronze and it is subjected to electrolysis for 10 minutes.

On leaving the tank, the part is covered in a 2 $\mu$m to 3 $\mu$m thick layer of white bronze.

The part is then rinsed, and dipped again under electrolysis into a bath of palladium for a few minutes.

On leaving the bath of palladium, the part has a 0.2 $\mu$m thick layer of palladium covering the layer of white bronze.

The part is again rinsed, and is then dipped under electrolysis in a bath of gold, using the same technology.

On leaving the bath of gold, the part is coated in a 0.1 $\mu$m thick layer of gold.

The part is then rinsed and dried.

During the above treatments, the entire part is coated, including its studs.

Thereafter the part is put into place on a printed circuit card, with its studs passing through holes in the card, which holes may be plated-through holes.

The ends of the studs thus project from the other side of the card.

They are soldered to the card by the flow (or "wave") soldering technique which consists in placing the printed circuit card close to the surface of a bath of solder and in creating a wave on said surface, which wave advances and wipes the printed circuit card, wetting the studs that project from the card.

It will be understood that it is particularly important for the studs to be highly wettable, as indeed they are with the coating of the invention, so that when the wave goes past it has no tendency to exert any buoyancy thrust on the studs tending to lift them, since that could displace the part relative to the card.

Naturally, the implementation described above is not limiting in any way and any desirable modification may be made thereto without going beyond the ambit of the invention.

In particular, it is clear that the invention can be applied to other electrical components, for example an antenna or a portion of an antenna.

What is claimed is:

1. An electrical connector having an anti-corrosion coating, which coating is hard, non-toxic, non-magnetic, and solderable, wherein the coating is constituted by:

(a) a layer of white bronze;

(b) a fine layer consisting of palladium superimposed on the white bronze layer; and (c) a fine layer of gold superimposed on the palladium layer.

2. A metal part, coated with a coating according to claim 1.

3. A metal part according to claim 2, constituting an electrical connector.

4. A metal part according to claim 3, wherein the electrical connector is adapted to convey signals.

5. A electrical connector according to claim 1, wherein the thickness of the fine palladium layer lies in the range 0.1 $\mu$m to 0.2$\mu$; and the fine layer of gold in the range 0.05 $\mu$m to 0.2 $\mu$m.

6. An electrical connector according to claim 1, wherein the electrical connector is suitable to convey high frequency signals.

* * * * *